Jan. 29, 1963 K. J. CROOK 3,075,785
FRONT WHEEL STABILIZING DEVICE FOR MOTOR VEHICLES
Filed Oct. 10, 1960 2 Sheets-Sheet 1

INVENTOR.
KENNETH J. CROOK
BY
*Gregory L. Dolgorukov*
ATTORNEY

Jan. 29, 1963 K. J. CROOK 3,075,785
FRONT WHEEL STABILIZING DEVICE FOR MOTOR VEHICLES
Filed Oct. 10, 1960 2 Sheets-Sheet 2

INVENTOR.
KENNETH J. CROOK
BY
ATTORNEY

United States Patent Office 3,075,785
Patented Jan. 29, 1963

3,075,785
FRONT WHEEL STABILIZING DEVICE
FOR MOTOR VEHICLES
Kenneth J. Crook, 10528 Sterritt, Detroit, Mich.
Filed Oct. 10, 1960, Ser. No. 61,680
3 Claims. (Cl. 280—94)

This invention relates to steering and more particularly to an improved device for stabilizing steering linkage of motor vehicles.

From the very advent of motor vehicles it has been realized that with the high speed operation of such vehicles it is highly desirable and even necessary for safety purposes that the front wheels of a motor vehicle, which are the steering wheels thereof, have built into their steering controls some means whereby such wheels, when "left to themselves," i.e. are not acted upon by control forces, would assume the position for the vehicle to move straight forward.

There are numerous reasons why such a safety feature is necessary in a motor vehicle, particularly of the passenger type. One of such reasons is ease and safety of steering, particularly in situations such as going around a corner. When the turn around a corner is completed, it is necessary to turn the steering wheel back to its original straight position as soon as possible to prevent the vehicle from continuing to turn and striking the curb. The required safety feature must be of such a nature as to ensure that the wheels would tend to return to their straight position by themselves, or substantially by themselves, rather than requiring the operator to rapidly turn the steering wheel. Furthermore, in straight high speed driving, the above feature would provide for safe steering while the wheels that would not maintain themselves or not return themselves to the straight position would tend to cause vibration of the steering wheel and would require extremely watchful driving. Even slight turning of the wheels could cause them to turn more and perhaps throw the vehicle off the road. Such a condition would be extremely hazardous, particularly in heavy traffic and in mountain driving.

The above feature is incorporated in modern conventional motor vehicles through a construction providing so-called "caster effect." This name is derived from common casters used on chairs which tend to align themselves in the direction in which a chair is moved by trailing the legs to which they are pivotally attached. In a motor vehicle such effect is produced by a construction of a somewhat different type such, for instance, as the corresponding inclination of king pins. Thus, the term "caster" is used in connection with motor vehicles to indicate the effect rather than the type of construction.

It has been found, however, that with the advent of balloon tires, i.e. larger tires operating at lower pressures, and particularly of power steering, the steering wheels of motor vehicles became less stable than in motor vehicles of some years ago. In consequence thereof, it is commonly appreciated that motor vehicles of recent models require more attentive steering at high speeds and in mountain driving than motor vehicles of bygone days. This condition presented a difficult problem for those skilled in the art. Increasing the caster effect by the conventional expedients has already reached its maximum possibilities, and further attempts along the same lines introduce other problems equally or even more objectionable. As a result thereof, it became necessary for vehicle operators to keep their front wheels carefully aligned and balanced. Even a slight disalignment of the wheels which would not manifest itself in a noticeable manner in a motor vehicle of older makes causes severe shaking of the front end and of the steering wheels in motor vehicles of late makes, thus affecting confidence of the operator and causing worry and fatigue. It has also been found that maintaining perfect alignment of the front wheels proved to be rather difficult. Even a relatively mild shock, such as hitting a pot hole, or hitting the curb harder than usual in parking, may completely disorganize the alignment done only a few days or weeks prior thereto. All of the above disadvantages became, as mentioned, particularly pronounced in motor vehicles having power steering, affecting the dependability of such steering and the popularity thereof.

One of the objects of the present invention is to provide a stabilizing device for the steering wheel of a motor vehicle whereby the above difficulties and disadvantages are overcome and largely eliminated without introducing other problems or appreciably increasing the costs involved.

Another object of the present invention is to provide a stabilizing device associated with the steering linkage of a motor vehicle which tends to maintain or to return the steering wheels to their straight position with a greater force than that produced by the conventional means producing the caster effect, such force being fully sufficient to operate in such a manner not only with standard steering but also with power steering.

A still further object of the present invention is to provide an improved stabilizing device of the foregoing nature which operates supplementary to and independently of the conventional expedients producing the caster effect.

A still further object of the present invention is to provide a steering mechanism for a motor vehicle which is more stable and safer than conventional mechanisms, which is not so sensitive, and which does not require such frequent alignment and balancing of the front wheels as do conventional steering mechanisms.

A still further object of the present invention is to provide an improved steering mechanism including power means for operating the same in which mechanism the caster effect is sufficiently strong and eliminates the disadvantages and shortcomings of the conventional power steering mechanism.

A still further object of the present invention is to provide a stabilizing device of the foregoing nature which can be manufactured and distributed as an accessory susceptible of such distribution as a novel article of manufacture, and installed in motor vehicles already on the road, or as an optional equipment.

A still further object of the present invention is to provide a steering wheels stabilizing device for motor vehicles, which device may be installed in a motor vehicle without irreparably modifying its conventional steering system or making irreparable changes therein, such as drilling the tie rod and the like.

It is an added object of the present invention to provide an improved device of the foregoing nature which is simple and rugged in construction, safe and dependable in operation, and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figure 1:
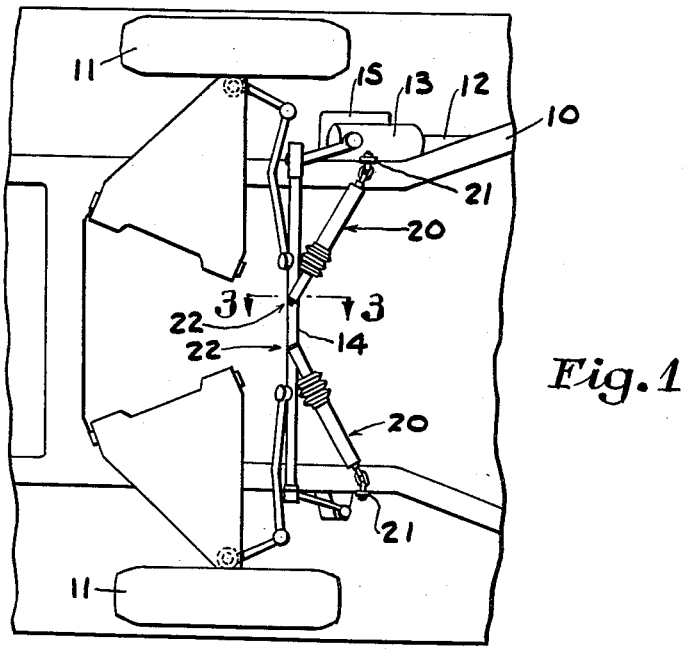
FIG. 1 is a fragmentary top view of the front part of a motor vehicle having an accessory embodying the present invention operatively installed therein.
Figure 2:
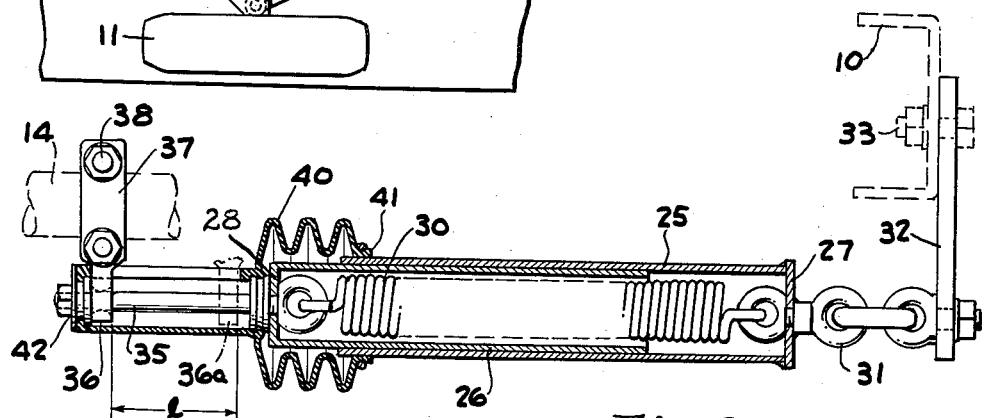
FIG. 2 is a view partly in section taken on the vertical section plane passing through the longitudinal axis of one of the spring units.
Figure 3:
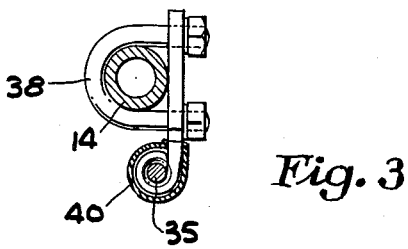
FIG. 3 is a fragmentary view, partly in section, taken in the direction of the arrows on the section plane passing through the line 3—3 of FIG. 1 and showing connection of one of the units to the tie rod of the vehicle.

In the drawings there are shown, by way of example, two accessory constructions embodying the present invention. Referring specifically to FIGS. 1–3, the accessory unit illustrated therein is shown installed in a motor vehicle which comprises generally a rigid structure including a frame 10 on the front end whereof are operatively mounted front wheels 11 manually controlled in a manner well known in the art by the steering mechanism (not shown) and including a steering column 12. The lower end of the steering column is operatively connected to a steering mechanism housed within a casing 13 and connected with the aid of steering linkage, including a tie rod 14, to the front wheels 11, in a manner well known in the art.

In FIG. 1 the front wheels 11, which are the wheels steering the vehicle, are shown in their straight positions for movement of the motor vehicle straight forward or backward, with other parts of the steering linkage being in their central positions. The motor vehicle also includes a power steering mechanism generally indicated at 15, which mechanism is controlled in a manner well known in the art from the steering mechanism and assists in moving the front wheels as required in steering. The construction so far described is a conventional one, and no detailed description thereof is deemed necessary herein for the purposes of disclosing the present invention.

In accordance with the invention, the accessory comprising two identical spring units is operatively installed in the vehicle, each of the two units being generally designated by the numeral 20. Each of said units 20 has one end hingedly connected to the frame 10, as shown at 21, with the opposite end of the unit secured to the tie rod 14, as generally shown at 22.

Each of the accessory units 20 comprises an outer casing 25 within which there is fitted for longitudinal movements a telescoping casing 26. Casings 25 and 26 have closed ends formed by plates 27 and 28, respectively, secured to the casings in any suitable manner, at which there are anchored the ends of a tension spring 30. To the end plate 27 there is also secured a chain 31 secured to a bracket 32. The bracket 32 is, in turn, secured to the frame 10 in any suitable manner, such as with the aid of a bolt 33. To the end plate 28 of the inner casing 26 there is secured a rod 35 passing through the eyelet of an eyelet member 36 secured to a bracket 37 which, in turn, is detachably mounted on the tie rod 14 in any suitable manner, such as with the aid of a U-shaped bolt generally designated by the numeral 38.

Each of the units 20 is covered at its end connected to the tie rod 14 with the aid of expanding bellows 40, one end of which is secured to the outer casing 25 as indicated at 41, and the other end to the rod 35, as indicated at 42. A suitable slot is provided in said bellows for passage of the eyelet member 36.

In the central position of the front wheels 11 and of the tie rod 14, the position of the operative parts of each of the units 20 are as shown in FIG. 2. In turning the wheels, caused by the corresponding movement of the tie rod 14, the eyelet member 36 of the unit pressing, because of its movement with the tie rod 14, on the end stop 42 of the rod 35 operates to pull the telescoping member 26 out and thus to stretch the tension spring 30. Thus, turning of the wheels 11 is done in opposition to said spring 30, and in doing so with the aid of power steering means 15 resilient energy is stored in the spring 30.

It will be noted that the condition of the other unit 20 on the opposite side with respect to tension of its spring is not changed by the above described operation. This is accomplished through the provision of a lost motion mechanism in each of said units by virtue of the eyelet member 36 sliding on the rod 35 to the position indicated in FIG. 2 in dotted lines and designated therein by 36a. Thus, the distance designated in FIG. 2 by the letter I represents the length of the lost motion. This length is determined in designing the device by the distance of movement of the tie rod 14 from its central position to the extreme position on each side. It will be understood that said distance I would represent one-half of the total movement of the tie rod 14 between its extreme positions at the right and at the left of the vehicle.

It will now be clear, in view of the foregoing, that after the turn is completed, the spring 30 being in tension urges the wheels 11 to return to their straight position, thus aiding the effort exerted in that direction by the operator through the steering linkage as well as any force that may be exerted in the same direction by the power steering unit. Accordingly, the tie rod 14 in returning to its central position from the right is assisted by the spring of the left hand side unit, while the condition of the right hand side unit remains unchanged except for the movement of the lost motion mechanism. In returning from the extreme left position, the tie rod 14 is assisted by the spring of the right hand side unit, in the process of which movement the distance travelled by the lost motion device is consumed. The units 20 are so installed that their springs 30 of both units may be slightly pretensioned in the central position of the tie rod to prevent any rattling or slack movement of the parts.

It will be understood that the rates of the springs in the units 20 are the same. Therefore, the resilient forces developed by both units are equal, and both units are in a balanced condition only at the central position of the tie rod 14. Any movement of the tie rod 14 away from such position would tension the spring of the corresponding unit and cause it to urge the tie rod to return to its central position.

By virtue of such a construction, the front wheels 11 of the vehicle are maintained in their straight forward position, and in steering the vehicle said wheels tend to go straight forward and do not exhibit any self-turning tendencies requiring extreme attention on the part of the driver. In addition, after completion of the turn, the wheels 11 return to their straight position much faster and without the necessity on the part of the operator to exert rapid effort in turning the wheel on the steering column. Thus, much of the fatigue of driving, now clearly noticeable in conventional vehicles, is eliminated by installation therein of my improved accessory.

Because of the above described construction my improved accessory can be installed in a motor vehicle already on the road merely by attaching the outer ends of the units to the frame 10 with the aid of bolts 33 and connecting their inner ends to the tie rod, as shown. Such connection leaves no irreparable changes in the steering mechanism, such as drilling holes in the tie rod and the like. My improved accessory can be taken off also in any easy manner without leaving any irreparable changes in the vehicle except for the hole in the frame for passage of the bolt 33. However, even this hole may be eliminated by providing a connection to the frame 10 of a similar nature as is done with respect to the tie rod 14.

Figure 4:
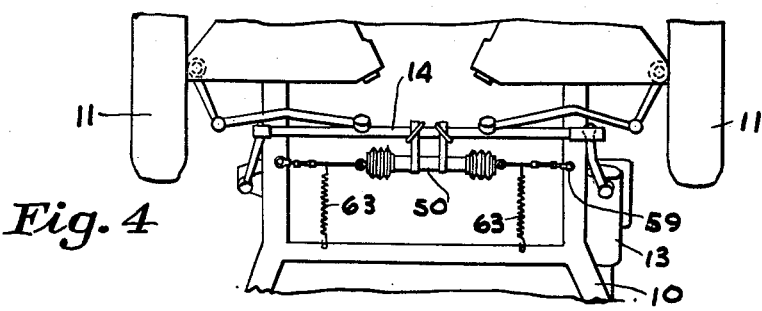
FIG. 4 is a view similar in part to FIG. 1 but showing an accessory embodying the present invention, of a modified construction.
Figure 5:
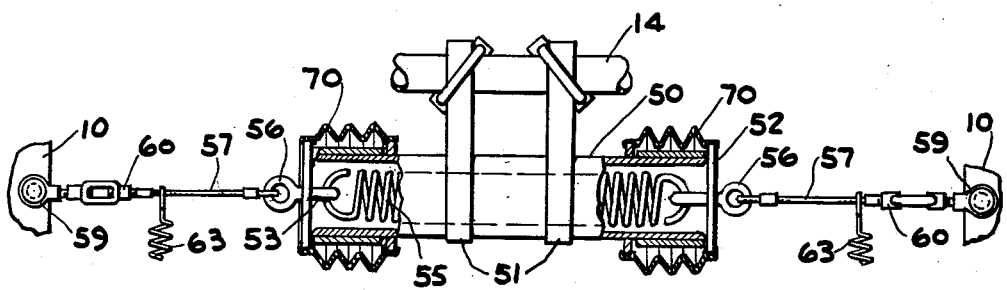
FIG. 5 is a view showing on an enlarged scale a portion of the construction of FIG. 4, particularly the main casing and its connecting means, with the ends of said casing being shown in longitudinal sections, and showing the operative parts of the device in positions corresponding to the central position of the unit and straight forward position of the front wheels of the vehicle.
Figure 6:
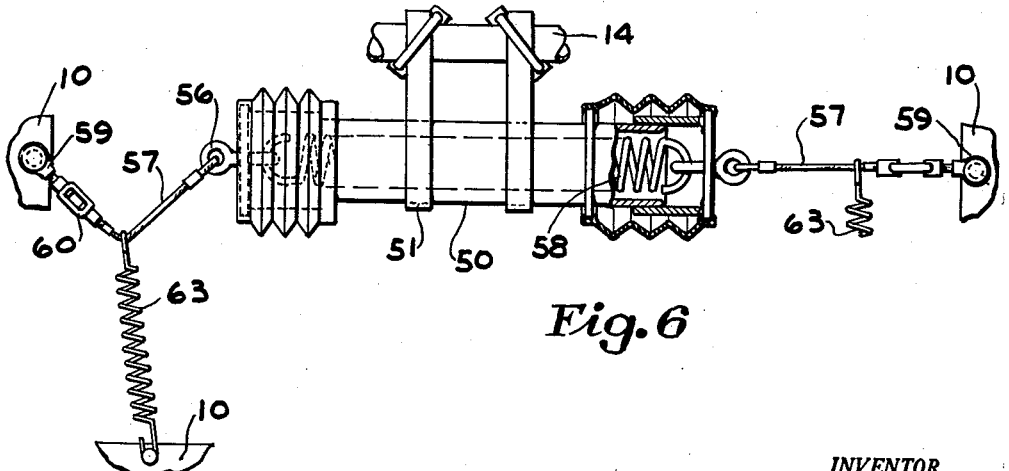
FIG. 6 is a view similar in part to FIG. 5 but showing positions of the parts of the device corresponding to the position of the unit and of the front wheels in turning to the left.

FIGS. 4-6 illustrate an accessory of a simplified construction and comprising only a single unit. Therefore, the device of FIGS. 4-6 is less expensive and is easier to install. Again, this device can be detachably installed in vehicles already on the road and removed therefrom in an equally easy manner.

Referring specifically to the drawings, the device of a modified construction comprises a casing 50 having secured thereto two brackets 51 with the aid of which it can be secured to the tie rod 14. On both of its ends the casing 50 carries cup-shaped members 52 slidably fitted on the casing 50. To said cup-shaped member 52 at the inner ends thereof there are secured, as indicated at 53, the ends of a tension spring 55. The spring 55 is slightly pretensioned and, therefore, the members 52 are kept firmly against the ends of the casing 50. To each of the members 52 there are connected in any suitable manner, such as at eyelets 56, cables 57 having their outer ends connected to the frame 10 as indicated at 59. The connections 50 may include turnbuckles 60, as indicated, for adjustment purposes.

It will now be seen, in view of the foregoing, that with the unit being installed as illustrated in FIG. 4 and with the ends 59 of the cables 57 being connected to the frame and properly adjusted with the aid of the turnbuckles 60, the unit will be located in its central position, with the cables 57 being evenly tensioned and straight.

When the operator turns the wheel on the steering column to turn the front wheels 11 of the vehicle to the left, movement of the tie rod 14 to the left brings the unit in the condition illustrated in FIG. 6, wherein the casing 50 moves to the left together with its cup-shaped member 52. Such movement of the casing 50 causes tensioning the spring 55 and moving the right hand end of the casing 50 virtually to the end of the cylindrical portion of the right hand member 52. However, the right hand member 52 itself remains in place because of the taut condition of the cable 57 on the right hand side of the unit, while the cable 57 on the left hand side of the unit develops a slack as shown in FIG. 6. Under such conditions the spring 55 will tend to urge the front wheels 11 of the vehicle toward their central or straight position.

Movement of the casing to the right in executing a right turn causes movement of the casing 50 together with the right hand cup-shaped member 52 to the right, putting the cable 57 on the left hand side in a taut condition and developing a slack in the cable on the right hand side.

In order to prevent the slack in the cable 57 falling down and perhaps catching on some object on the road, means are provided to take up the slack by moving the cable 57 upwardly. In the present embodiment of the invention said means are exemplified by two tension springs 63 secured to the part of the vehicle rigid with the frame and located preferably above the unit.

Bellows 70 are provided on both sides of the casing 50 to protect the mechanism from dirt and ice. As illustrated in FIGS. 5 and 6, the bellows 70 have their inner ends connected to the casing 50 and their outer ends connected to the ends or cup-shaped members 52 and are movable therewith.

By virtue of the above disclosed constructions, there are provided improved accessories for motor vehicles whereby the objects of the present invention listed above and numerous additional advantages are attained.

I claim:

1. An accessory for a motor vehicle having a frame, two movable steering front wheels, a steering mechanism including a tie rod connecting said wheels for joint movements, and a manually controlled power means assisting in moving said wheels in steering; said accessory comprising an elongated casing connected to the tie rod for movements therewith, two cup-shaped members slidably fitted on the ends of said casing, tensioned means for each of said cup-shaped members connecting them to the vehicle frame, respectively, tension spring means disposed within said casing and holding said cup-shaped members against the ends thereof, said spring means thus urging said casing and the tie rod to remain in their central position corresponding to the straight forward position of the steering wheels, and resiliently resisting movements of the tie rod and of the steering front wheels to the sides as in turning, with said movement causing stretching of said tension spring means and movement of the respective cup-shaped member in the direction of turning, with the cup-shaped member on the opposite side being restrained from moving in the same direction by its respective tensioned means, and lost motion mechanism of each of said tensioned means coming into play when the respective cup-shaped member moves in the direction of turning.

2. The invention defined in claim 1, the tensioned means holding the cup-shaped members to the vehicle frame being in the form of two cables, each having one end secured to the vehicle frame and the other end secured to the respective cup-shaped member, the lost movement in each of said cables being attained by the slack developing in the respective cable.

3. The invention defined in claim 1, the tensioned means holding the cup-shaped members to the vehicle frame being in the form of two cables, each having one end secured to the vehicle frame and the other end secured to the respective cup-shaped member, the lost movement in each of said cables being attained by the slack developing in the respective cable, and tension spring means for each said cables, said last-mentioned means adapted to take up the slack in the respective cable as the same develops.

References Cited in the file of this patent

UNITED STATES PATENTS

| | | |
|---|---|---|
| 1,275,625 | Stedman | Aug. 13, 1918 |
| 1,290,634 | Mock | Jan. 7, 1919 |
| 1,486,612 | Stokes | Mar. 11, 1924 |
| 1,581,930 | Lambert | Apr. 30, 1926 |
| 1,680,603 | Ernst | Aug. 14, 1928 |
| 2,096,650 | Del Rio | Oct. 19, 1937 |
| 2,964,119 | Gray et al. | Dec. 13, 1960 |